2,779,157
NOZZLE WITH VARIABLE DISCHARGE ORIFICE

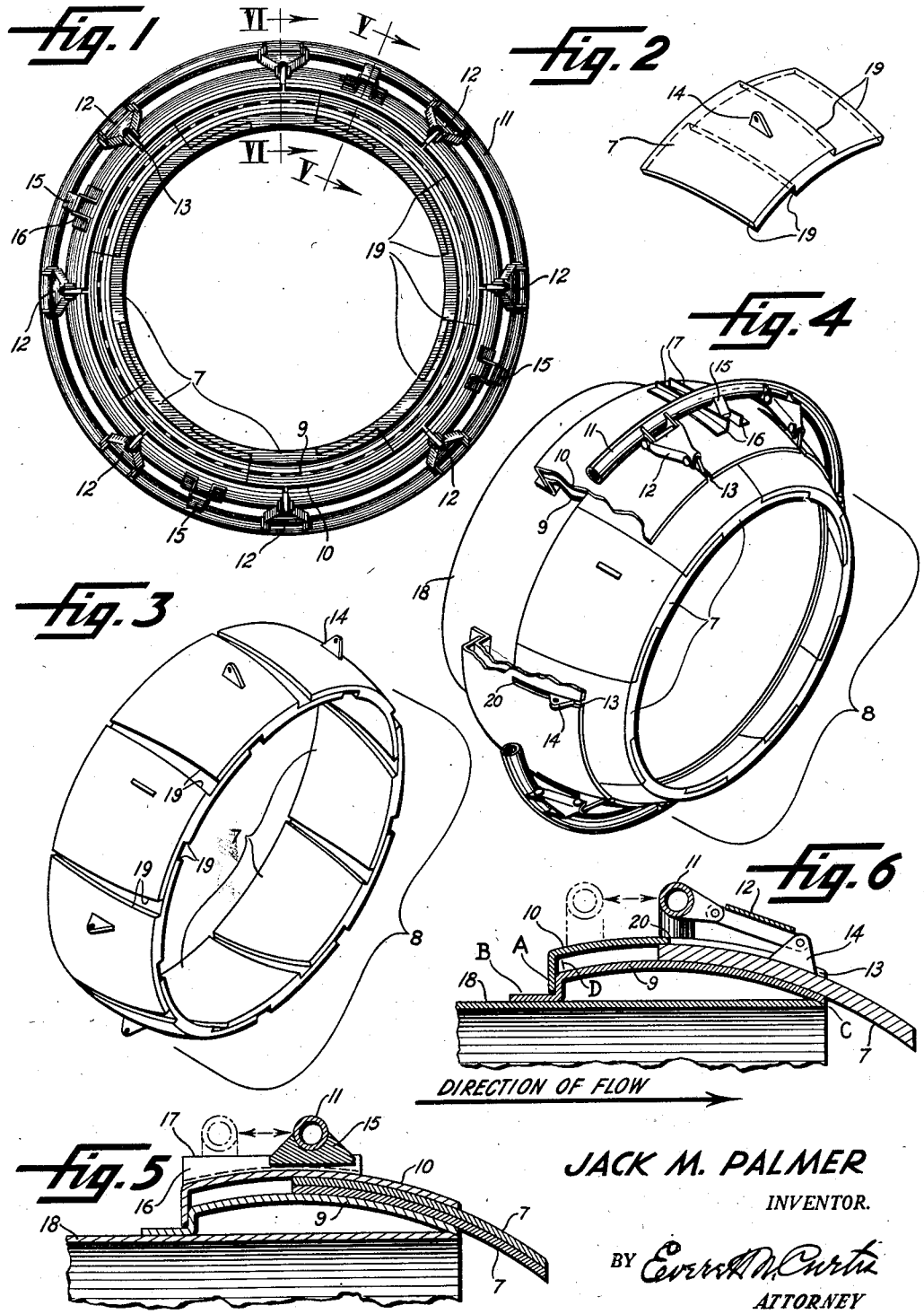
Jan. 29, 1957 — J. M. PALMER — 2,779,157
NOZZLE WITH VARIABLE DISCHARGE ORIFICE
Filed Feb. 14, 1951
JACK M. PALMER
INVENTOR.
BY *Everett M. Curtis*
ATTORNEY United States Patent Office 2,779,157
Patented Jan. 29, 1957

Jack M. Palmer, Chula Vista, Calif., assignor to Rohr Aircraft Corporation, Chula Vista, Calif., a corporation of California Application February 14, 1951, Serial No. 210,832

5 Claims. (Cl. 60—35.6)

The invention relates to variable discharge nozzles and is particularly, although not necessarily, adapted for use in conjunction with the tailpipe of an aircraft jet engine.

It is an object of this invention to provide facilities for varying the area of the exhaust gas discharge opening in a jet engine tailpipe.

Another object is to provide a device of this character which furnishes and maintains a true circular discharge opening, in order that the exhaust gas thrust pattern remains radially symmetrical about the thrust axis, and is relatively undisturbed as compared to existent non-symmetrical openings.

A further object is to provide a device of this character which is capable of any desired intermediate setting between its extreme large and small openings.

Still a further object is to provide a device of this character which is substantially leakproof.

Other objects are apparent in the description as hereinafter fully set forth.

Prior to the installation of a jet engine, its rated static thrust must be determined. The normal thrust varies between different engines, making it necessary to test each individual engine in order to establish the optimum area of its exhaust gas discharge opening. This is accomplished by varying the opening area until the desired thrust is indicated and the optimum area thus determined. One well known method, in current use, involves a set of orifice fittings, the openings of which represent a range of areas beginning with that of the smallest practicable opening and graduating with each different fitting toward that of the largest opening. The fittings are installed one at a time in the discharge end of the engine's tailpipe and checked during operation of the engine, until the proper area is determined. This procedure is time consuming, since each engine must be tested and rated individually, similarity of make or model notwithstanding.

Also, it is well known that the performance of aircraft jet engines fluctuates with the varying atmospheric conditions encountered at different altitudes, and is generally better in those conditions which prevail at higher altitudes. In order to obtain maximum performance under all such conditions, it is necessary to provide means for varying the area of the tailpipe's discharge opening. Such variance of opening area (combined with certain other factors i. e., pressure, temperature and volume of gases within the tailpipe) has the effect of regulating the velocity of the gases being discharged, and thus augmenting the engine's thrust. Such thrust augmentation is particularly valuable during takeoff and climb, at which time the engine's normal performance is limited. It is also very useful where sudden acceleration of speed is required, as for instance, in tactical maneuvers of fighter aircraft.

Another system of thrust augmentation commonly known as "after-burning" consists in the injection and burning of additional fuel in the tailpipe downstream of the turbine. This increases the temperature and correspondingly the volume of the gases within the tailpipe. Such after-burning requires a discharge opening area different from that required by normal fuel burning, thus necessitating means for varying the said area in order to meet both requirements.

Essentially, my invention consists in a group of interfitted concavo-convex members (hereinafter referred to as sub-segments) which as a unit, form an annular spherical segment taken between two parallel planes. These sub-segments are arranged in side by side relationship, their convex surfaces forming the outer surface of the said annular spherical segment, while their concave surfaces form its inner surface. The segment is interposed between an inner and outer shell, both of which are spherically shaped to conform with its inner and outer surfaces, respectively. The sub-segments are movable simultaneously between the shells, back or forth along individual spherical loca, each said locus lying on a great circle which passes through the axis of the annular segment. Each sub-segment partially overlaps one adjacent sub-segment and is in turn partially overlapped by the oppositely adjacent sub-segment. Pivotally attached to each sub-segment and extending outward through a corresponding slot in the outer shell, is a linkage assembly, the outer end of which is pivotally attached to an actuator ring which surrounds the outer shell. Spaced equidistantly around the actuator ring and attached thereto, are guides which travel in tracks attached to the outer shell, for the purpose of stabilizing the ring and ensuring its balanced operation. A tubular sleeve lines the inside of the nozzle and is attached to the inner shell. All components of the nozzle are preferably made of heat resistant material such as stainless steel or equivalent, in view of the excessive operating temperatures in jet engine tailpipes.

Attention is hereby directed to the accompanying drawing which illustrates a preferred embodiment of my invention, similar numerals of designation referring to similar parts throughout the several views, and in which:

Figure 1 is a view looking directly into the nozzle which is shown adjusted to its minimum opening.

Figure 2 is a perspective view showing the detailed structure of the individual sub-segments.

Figure 3 is a perspective view showing the relationship of the interfitted sub-segments when the nozzle is adjusted to its maximum opening.

Figure 4 is a perspective view showing the nozzle adjusted to its minimum opening, parts of the nozzle being cut away to show the relationship of its component members.

Figure 5 is a sectional view of Figure 1, taken along the line V—V.

Figure 6 is a sectional view of Figure 1, taken along the line VI—VI.

Referring to Figures 1 and 4, the sub-segments 7, which as a unit form the annular spherical segment 8, are shown interposed between an inner shell 9 and an outer shell 10. The inner shell 9 is spherically shaped to conform with the inner surface of the annular segment 8, and the outer shell 10 is spherically shaped to conform with the outer surface of the said annular segment. Surrounding the outer shell 10 is the actuator ring 11 which together with the linkage members 12, serves to actuate the sub-segments 7 simultaneously back or forth to adjust the discharge opening of the nozzle. The ring itself may be coupled to, and operated by any suitable means (not shown). As may be seen, the linkage members 12 are each pivotally attached at one end to a sub-segment 7, and are pivotally attached at their opposite ends to the actuator ring 11. When the said ring is moved in the direction of the discharge opening, the area of the opening is decreased by the downstream edges of sub-segments 7 and conversely, when moved in the opposite direction, the opening area is increased. The slots 13 in the outer shell 10 provide freedom of movement for the linkage attachment lugs 14, one of which is attached to each of sub-segments 7. Shown attached to the ring 11 are guides 15, positioned to slide within the tracks 16 mounted upon the outer shell 10. The top edges 17 of tracks 16 are parallel to the axis of the nozzle, in order to ensure engagement at all times with guides 15. This is made necessary by the fact that the distance between the said guides and the surface of the outer shell 10 varies with each different position of the ring 11, due to the spherical shape of the said shell (see Figure 5). The nozzle is lined by a tubular sleeve 18 which provides a flow area of constant diameter within the nozzle in order to avoid turbulence which would otherwise be created by the concave area of the inner shell 9. It may be seen that in the minimum opening adjustment, the edge surfaces 19 of each sub-segment 7 are in contacting relationship with those of the two adjacent sub-segments. This has the effect of limiting the travel of sub-segments 7 upon reaching the minimum opening adjustment. Travel of the sub-segments is limited upon reaching maximum opening adjustment by contact of the linkage attachment lugs 14 with the termini 20 of slots 13.

Referring to Figure 2, the construction of the sub-segments 7 is such that when the nozzle is adjusted to its minimum opening, edge surfaces 19 of each sub-segment are in contact with those of the sub-segments adjacent thereto, as illustrated in Figures 1 and 4.

Referring to Figure 3, the annular spherical segment 8 is shown as it appears at maximum opening adjustment, the remainder of the nozzle having been omitted for clarity. It may be seen that in this position the edge surfaces 19 of sub-segments 7 are in spaced relationship. This is explained by the fact that in making this adjustment the sub-segments 7 are shifted over a greater portion of the inner shell 9 (see Figure 6) causing expansion of the annular segment 8 to cover the increased area. This expanding action has the effect of enlarging the discharge opening.

Referring to Figure 5, the tracks 16 are arranged in pairs spaced circumferentially around the outer shell 10 as illustrated in Figure 1. The guides 15 are attached correspondingly to the actuating ring 11, one said guide sliding within each pair of tracks when the ring 11 is moved back or forth to adjust the nozzle. The phantom lines indicate the position of ring 11 when the nozzle is in maximum opening adjustment.

Referring to Figure 6, the sub-segment 7 is shown interposed between the inner shell 9 and the outer shell 10. Attached (preferably welded) to the sub-segment 7 is the linkage attachment lug 14 positioned within the slot 13 provided in the outer shell 10. Pivotally attached to the lug 14 is the linkage member 12, which is also pivotally attached at its opposite end to the actuator ring 11. The inner shell 9 and the outer shell 10 are attached (preferably welded) to each other at the contact area designated A, the weld extending circumferentially around the nozzle. The tubular sleeve 18 is attached to the inside of the inner shell 9 at the contact areas designated B and C. The phantom lines indicate the position of the ring 11 when the nozzle is in maximum opening adjustment, the upstream edge of sub-segment 7 being shown at the location designated D, the downstream edge of said sub-segment being substantially flush with that of the inner shell 9, and the lug 14 being against the terminus 20 of slot 13.

For purposes of clarity, the thicknesses of the component parts of the nozzle have been considerably exaggerated throughout the several views of the drawing.

My invention may be embodied in other specific forms without departing from the spirit or essential characteristics thereof. The present embodiment, as herein set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

Having thus described my invention, what I claim as new and useful and desire to secure by Letters Patent is:

1. A variable nozzle comprising, in combination; a cylindrical tube; an annular inner shell having its upstream end secured to the outside of said tube at a region spaced from the downstream end thereof; an annular outer shell having its upstream end connected to the upstream end of said inner shell, said shells having concentric spaced apart spherical guide portions which slope in toward the downstream end of said tube; a plurality of spherically shaped rigid sub-segments disposed between and in engagement with said guide portions, each sub-segment having a curved edge portion which overlaps and has slidable engagement with the edge portion of the adjacent sub-segment; an actuating member pivotally connected to said sub-segments and arranged to simultaneously move said sub-segments along said shells and cause the downstream ends of said sub-segments to move past the downstream end of said tube and reduce the orifice area of the nozzle.

2. A variable nozzle as claimed in claim 1; in which said actuating member so moves said sub-segments as to cause the downstream ends thereof to continually lie in a common plane normal to the axis of said tube.

3. A variable nozzle as claimed in claim 1; in which the downstream end of said inner shell surrounds and engages the downstream end of said tube.

4. A variable nozzle comprising, in combination; a plurality of similar generally spherical shaped rigid sub-segments having their downstream ends disposed in a common plane, each sub-segment having a central portion of given uniform thickness and two protruding edge portions of substantially lesser thickness, one of said edge portions being constructed to overlie and slidably engage the outer face of the edge portion of the adjacent sub-segment and the other edge portion being constructed to underlie and slidably engage the inner face of the edge portion of the adjacent sub-segment; a cylindrical tube having its downstream end disposed within said sub-segments; a spherically shaped hollow support mounted on the downstream end of said tube and arranged to slidably support said sub-segments for movement past the downstream end of said tube along curved paths which converge towards the axis of the tube; and means connected to each of said sub-segments and arranged to move said sub-segments along said support sufficiently to cause their downstream ends to project past the downstream end of said tube and restrict the orifice area of the nozzle.

5. A variable nozzle comprising, in combination; a cylindrical tube; an annular inner shell secured to the outside of said tube; an annular outer shell supported by said tube, said shells having spaced apart concentric spherical guide portions; a plurality of spherically shaped rigid sub-segments disposed between and in engagement with said guide portions, said guide portions being arranged to direct the downstream ends of said sub-segments into the fluid stream leaving the tube; each of said sub-segments having a curved edge portion which overlaps and has slidable engagement with the edge portion of the adjacent sub-segment; a circular ring surrounding said outer shell, spaced apart members connecting said ring to said sub-segment; and means for guiding said ring along a path parallel to the axis of said tube, said guiding means comprising symmetrically arranged spaced apart blocks secured to said ring and a plurality of tracks secured to said outer shell and with which said blocks have sliding engagement.

References Cited in the file of this patent
UNITED STATES PATENTS

| | | |
|---|---|---|
| 186,310 | Curtis | Jan. 16, 1877 |
| 851,603 | Long | Apr. 23, 1907 |
| 2,382,016 | Love | Aug. 14, 1945 |
| 2,462,953 | Eaton et al. | Mar. 1, 1949 |
| 2,475,022 | Gregg | July 5, 1949 |
| 2,523,842 | Oulianoff | Sept. 26, 1950 |
| 2,597,253 | Melchior | May 20, 1952 |